United States Patent
Ishii et al.

(10) Patent No.: US 7,203,642 B2
(45) Date of Patent: Apr. 10, 2007

(54) ROBOT CONTROL APPARATUS AND METHOD WITH ECHO BACK PROSODY

(75) Inventors: Kazuo Ishii, Tokyo (JP); Jun Hiroi, Tokyo (JP); Wataru Onogi, Tokyo (JP); Takashi Toyoda, Tokyo (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 10/148,914

(22) PCT Filed: Oct. 10, 2001

(86) PCT No.: PCT/JP01/08898

§ 371 (c)(1),
(2), (4) Date: Sep. 24, 2002

(87) PCT Pub. No.: WO02/31810

PCT Pub. Date: Apr. 18, 2002

(65) Prior Publication Data

US 2003/0055653 A1 Mar. 20, 2003

(30) Foreign Application Priority Data

Oct. 11, 2000 (JP) .............................. 2000-310015
Jan. 25, 2001 (JP) .............................. 2001-16872

(51) Int. Cl.
*G10L 13/08* (2006.01)
*A63H 5/00* (2006.01)

(52) U.S. Cl. ...................... 704/231; 704/258; 704/272; 446/297

(58) Field of Classification Search ................ 704/258, 704/260, 266, 268, 269, 272, 275, 231; 446/297, 446/301
See application file for complete search history.

(56) References Cited

U.S. PATENT DOCUMENTS 4,896,357 A * 1/1990 Hatano et al. .............. 704/275

(Continued)

FOREIGN PATENT DOCUMENTS

EP 0 730 261 9/1996

(Continued)

OTHER PUBLICATIONS

Suzuki etal., "Psychological Effects Derived from Echoic Mimicry Using Inarticulate Sounds", vol. 41, No. 5, p. 1328-1338, May 2000.

(Continued)

*Primary Examiner*—Martin Lerner
(74) *Attorney, Agent, or Firm*—Frommer Lawrence & Haug LLP; William S. Frommer; Paul A. Levy

(57) ABSTRACT

The present invention relates to robot control apparatuses which make a user recognize that speech is accepted. A user's speech input to a microphone 15 is subjected to speech recognition by a speech recognizer 50A. Based on the speech recognition result, an action determining unit 52 determines subsequent actions to be taken by a robot. At the same time, an echo back unit 56 analyzes prosodic information of the user's speech input to the microphone 15 and, based on the prosodic information, generates echo back speech which is prosody-controlled speech. The echo back speech is supplied to a loudspeaker 18 through an output controller 57 and is output from the loudspeaker 18.

10 Claims, 9 Drawing Sheets

U.S. PATENT DOCUMENTS

| | | | | |
|---|---|---|---|---|
| 5,045,327 | A | * | 9/1991 | Tarlow et al. ............... 704/270 |
| 5,802,488 | A | | 9/1998 | Edatsune |
| 5,933,805 | A | * | 8/1999 | Boss et al. .................. 704/249 |
| 6,161,091 | A | * | 12/2000 | Akamine et al. ........... 704/258 |
| 6,173,260 | B1 | * | 1/2001 | Slaney ........................ 704/250 |
| 6,394,872 | B1 | * | 5/2002 | Watanabe et al. ........... 446/175 |
| 6,572,431 | B1 | * | 6/2003 | Maa ............................ 446/301 |
| 6,604,980 | B1 | * | 8/2003 | Jurmain et al. ............. 446/296 |
| 6,663,393 | B1 | * | 12/2003 | Ghaly ........................ 434/262 |
| 6,795,808 | B1 | * | 9/2004 | Strubbe et al. ............. 704/275 |
| 6,959,166 | B1 | * | 10/2005 | Gabai et al. ................ 434/308 |
| 6,980,956 | B1 | * | 12/2005 | Takagi et al. ............... 704/275 |

FOREIGN PATENT DOCUMENTS

| | | |
|---|---|---|
| JP | 4-37997 | 6/1992 |
| JP | 8-297498 | 11/1996 |
| JP | 9-62480 | 3/1997 |
| JP | 9-152884 | 6/1997 |
| JP | 10-111786 | 4/1998 |
| JP | 2000-29492 | 1/2000 |
| JP | 2000-135186 | 5/2000 |
| JP | 2000-254359 | 9/2000 |
| JP | 2000-259601 | 9/2000 |

OTHER PUBLICATIONS

Moriyama T et al: "Emotion recognition and synthesis system on speech" Multimedia Computing and Systems, 1999. IEEE International Conference on Florence, Italy Jun. 7-11, 1999, Los Alamitos, CA, USA,IEEE Comput. Soc, US, vol. 1, Jun. 7, 1999, pp. 840-844, XP010342838 ISBN: 0-7695-0253-9.

Hiroaki Noguchi and Yasuharu Den: "Prosody-Based Detection of the Context of Backchannel Responses" Proceedings of ICSLP-98, Oct. 1998, p. P662, XP007000479.

* cited by examiner

ROBOT CONTROL APPARATUS AND METHOD WITH ECHO BACK PROSODY

TECHNICAL FIELD

The present invention relates to robot control apparatuses, and more specifically relates to, for example, a robot control apparatus suitable for use in a robot which acts based on a speech recognition result obtained by a speech recognizer.

BACKGROUND ART

Recently, for example, robots (including teddy bears and dolls in the present description) for performing speech recognition from speech generated by a user and for performing particular actions or outputting synthesized sounds based on the speech recognition result have been manufactured as toys and the like.

Even when a speech recognition result is obtained, a robot may not perform any actions. In this case, a user becomes anxious about whether the speech is recognized by the robot or the robot is broken.

DISCLOSURE OF INVENTION

In view of the foregoing circumstances, it is an object of the present invention to enable a user to know that the user's speech is recognized by the robot, thereby easing the user's anxiety.

A robot control apparatus according to the present invention includes analyzing means for analyzing prosodic information of a user's speech which is subjected to speech recognition; generating means for generating, based on the prosodic information, prosody-controlled speech data which is speech data in which prosody is controlled; and output control means for controlling the outputting of the prosody-controlled speech data.

A robot control method according to the present invention includes an analyzing step of analyzing prosodic information of a user's speech which is subjected to speech recognition; a generating step of generating, based on the prosodic information, prosody-controlled speech data which is speech data in which prosody is controlled; and an output control step of controlling the outputting of the prosody-controlled speech data.

A recording medium according to the present invention has recorded therein a program including an analyzing step of analyzing prosodic information of a user's speech which is subjected to speech recognition; a generating step of generating, based on the prosodic information, prosody-controlled speech data which is speech data in which prosody is controlled; and an output control step of controlling the outputting of the prosody-controlled speech data.

A program according to the present invention includes an analyzing step of analyzing prosodic information of a user's speech which is subjected to speech recognition; a generating step of generating, based on the prosodic information, prosody-controlled speech data which is speech data in which prosody is controlled; and an output control step of controlling the outputting of the prosody-controlled speech data.

According to the present invention, prosodic information of a user's speech which is subjected to speech recognition is analyzed. Based on the prosodic information, prosody-controlled speech data which is speech data in which prosody is controlled is generated and output.

BEST MODE FOR CARRYING OUT THE INVENTION

Figure 1:
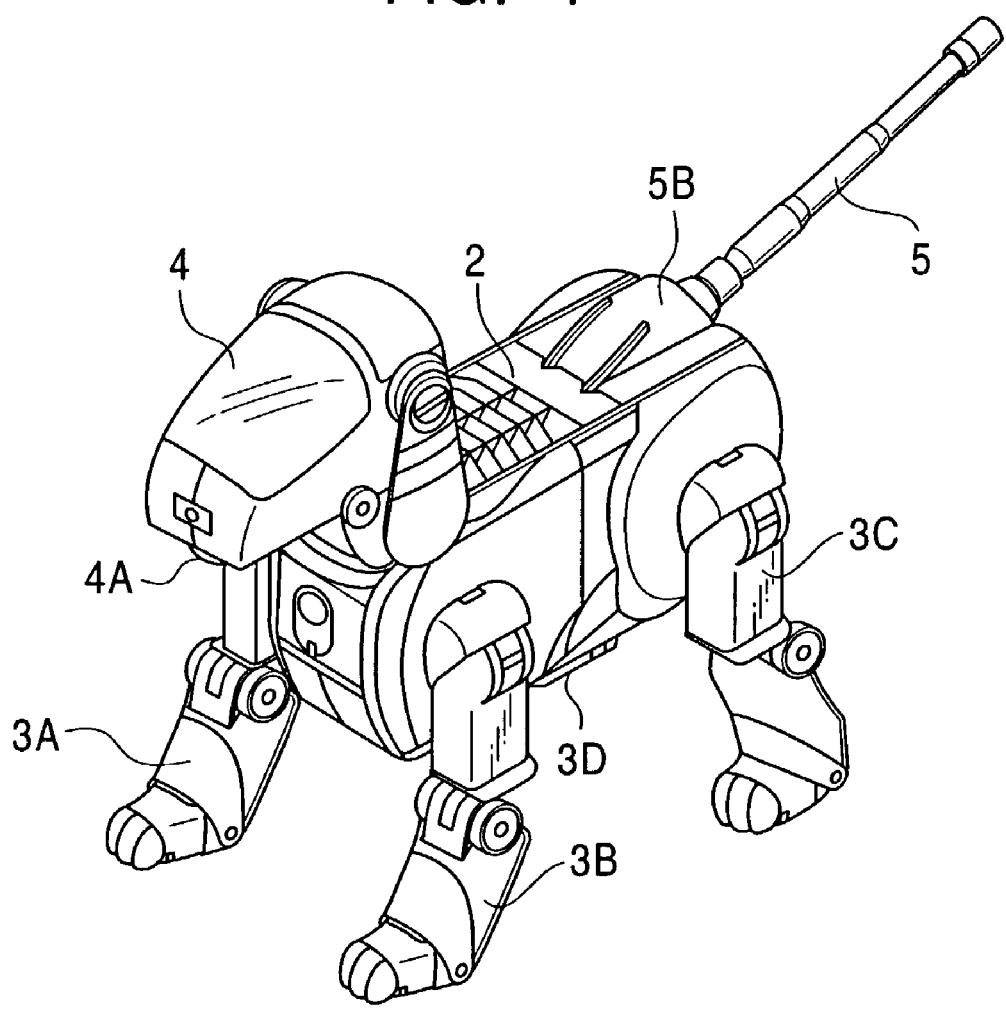
FIG. 1 is a perspective view of the external structure of a robot according to an embodiment of the present invention.
Figure 2:
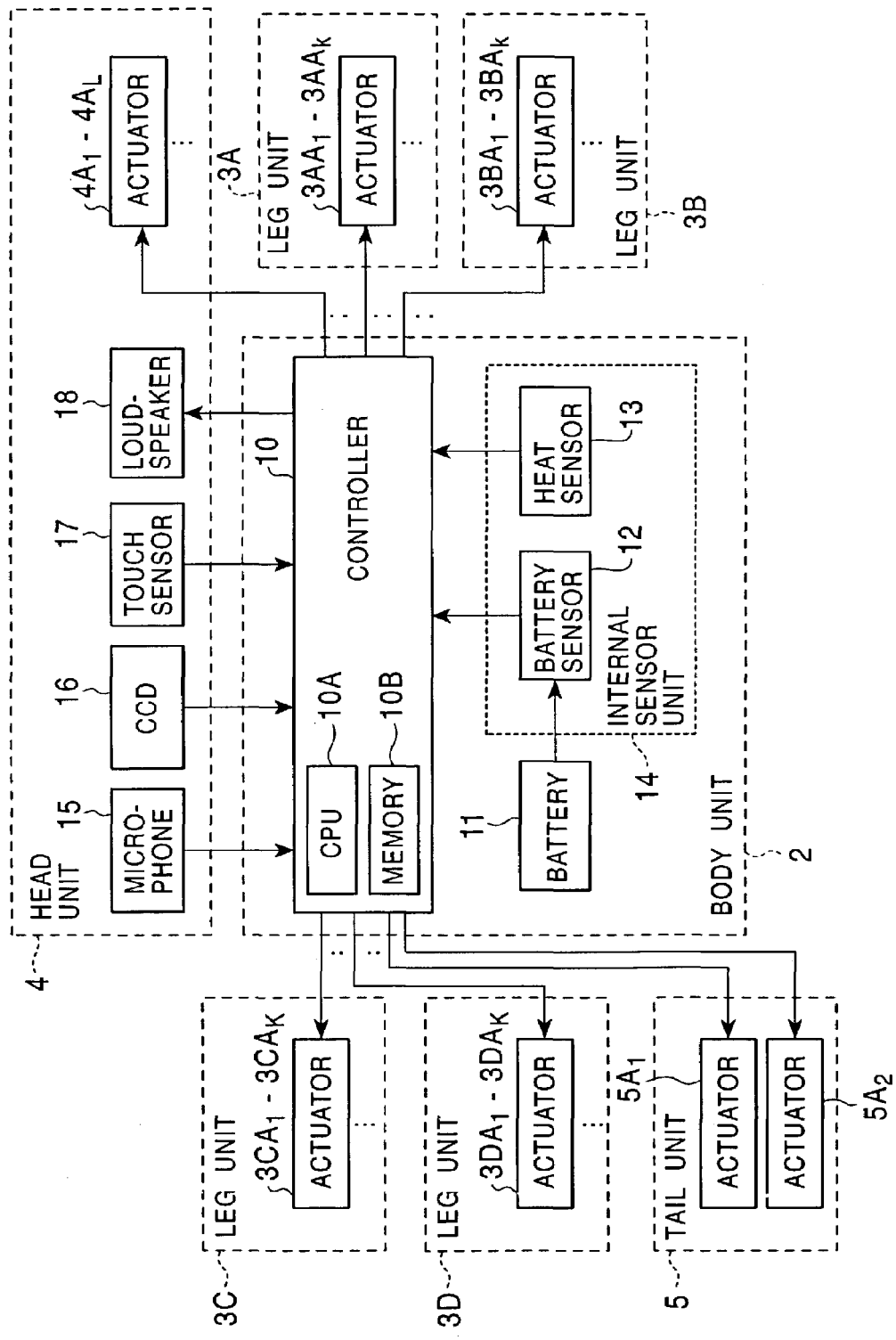
FIG. 2 is a block diagram showing an example of the internal structure of the robot.

FIG. 1 shows an external view of a robot according to an embodiment of the present invention. FIG. 2 shows the electrical configuration of the robot.

In the present embodiment, the robot has the form of a four-legged animal such as a dog. Leg units 3A, 3B, 3C, and 3D are connected to a body unit 2. Also, a head unit 4 and a tail unit 5 are connected to the body unit 2 at the front and at the rear, respectively.

The tail unit 5 is extended from a base unit 5B provided on the top of the body unit 2, and the tail unit 5 is extended so as to bend or swing with two degree of freedom.

The body unit 2 includes therein a controller 10 for controlling the overall robot, a battery 11 as a power source of the robot, and an internal sensor unit 14 including a battery sensor 12 and a heat sensor 13.

The head unit 4 is provided with a microphone 15 that corresponds to "ears", a CCD (Charge Coupled Device) camera 16 that corresponds to "eyes", a touch sensor 17 that corresponds to a touch receptor, and a loudspeaker 18 that corresponds to a "mouth", at respective predetermined locations. Also, the head unit 4 is provided with a lower jaw 4A which corresponds to a lower jaw of the mouth and which can move with one degree of freedom. The lower jaw 4a is moved to open/shut the robot's mouth.

As shown in FIG. 2, the joints of the leg units 3A to 3D, the joints between the leg units 3A to 3D and the body unit 2, the joint between the head unit 4 and the body unit 2, the joint between the head unit 4 and the lower jaw 4A, and the joint between the tail unit 5 and the body unit 2 are provided with actuators $3AA_1$ to $3AA_K$, $3BA_1$ to $3BA_K$, $3CA_1$ to $3CA_K$, $3DA_1$ to $3DA_K$, $4A_1$ to $4A_L$, $5A_1$, and $5A_2$, respectively.

The microphone 15 of the head unit 4 collects ambient speech (sounds) including the speech of a user and sends the generated speech signals to the controller 10. The CCD camera 16 captures an image of the surrounding environment and sends the generated image signal to the controller 10.

The touch sensor 17 is provided on, for example, the top of the head unit 4. The touch sensor 17 detects pressure applied by a physical contact, such as "patting" or "hitting"

by the user, and sends the detection result as a pressure detection signal to the controller 10.

The battery sensor 12 of the body unit 2 detects the power remaining in the battery 11 and sends the detection result as a battery remaining power detection signal to the controller 10. The heat sensor 13 detects heat in the robot and sends the detection result as a heat detection signal to the controller 10.

The controller 10 includes therein a CPU (Central Processing Unit) 10A, a memory 10B, and the like. The CPU 10A executes a control program stored in the memory 10B to perform various processes.

Specifically, the controller 10 determines the characteristics of the environment, whether a command has been given by the user, or whether the user has approached, based on the speech signal, the image signal, the pressure detection signal, the battery remaining power detection signal, and the heat detection signal, supplied from the microphone 15, the CCD camera 16, the touch sensor 17, the battery sensor 12, and the heat sensor 13, respectively.

Based on the determination result, the controller 10 determines subsequent actions to be taken. Based on the action determination result, the controller 10 activates necessary units among the actuators $3AA_1$ to $3AA_K$, $3BA_1$ to $3BA_K$, $3CA_1$ to $3CA_K$, $3DA_1$ to $3DA_K$, $4A_1$ to $4A_L$, $5A_1$, and $5A_2$. This causes the head unit 4 to sway vertically and horizontally and the lower jaw 4A to open and shut. Furthermore, this causes the tail unit 5 to move and activates the leg units 3A to 3D to cause the robot to walk.

As circumstances demand, the controller 10 generates a synthesized sound or echo back speech described below and supplies the generated sound to the loudspeaker 18 to output the sound. In addition, the controller 10 causes an LED (Light Emitting Diode) (not shown) provided at the position of the "eyes" of the robot to turn on, turn off, or flash on and off.

Accordingly, the robot is configured to behave autonomously in accordance with the surrounding states and the like.

Figure 3:
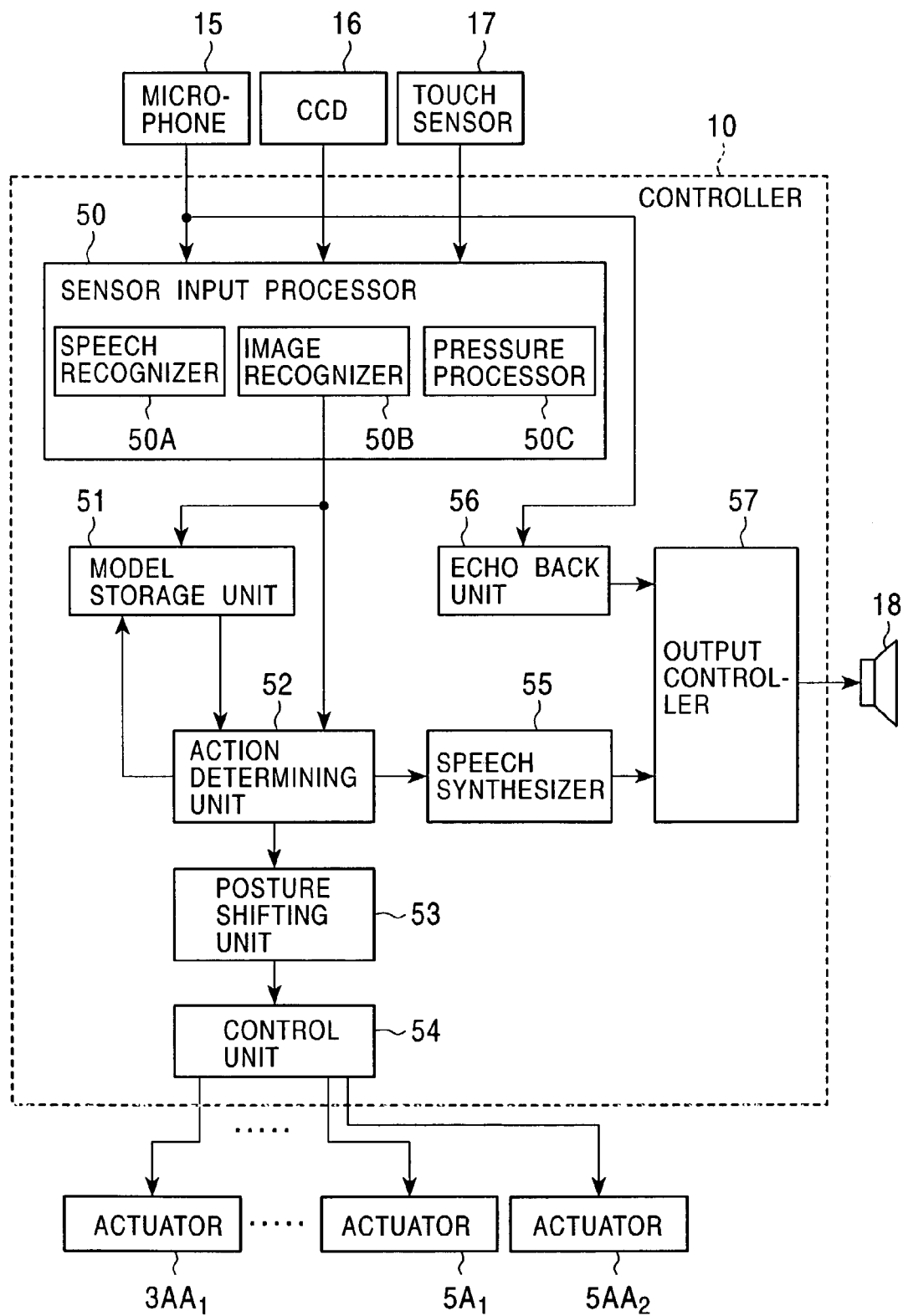
FIG. 3 is a block diagram showing an example of the function structure of a controller 10.

FIG. 3 shows an example of the function structure of the controller 10 shown in FIG. 2. The function structure shown in FIG. 3 is implemented by the CPU 10A executing the control program stored in the memory 10B.

The controller 10 includes a sensor input processor 50 for recognizing a specific external state; a model storage unit 51 for accumulating recognition results obtained by the sensor input processor 50 and expressing emotional, instinctual, and growth states; an action determining unit 52 for determining subsequent actions based on the recognition results obtained by the sensor input processor 50; a posture shifting unit 53 for causing the robot to actually perform an action based on the determination result obtained by the action determining unit 52; a control unit 54 for driving and controlling the actuators $3AA_1$ to $5A_1$ and $5A_2$; a speech synthesizer 55 for generating a synthesized sound; an echo back unit 56 for outputting echo back speech; and an output controller 57 for controlling the outputting of speech data.

The sensor input processor 50 recognizes a specific external state, a specific approach made by the user, and a command given by the user based on the speech signal, the image signal, the pressure detection signal, and the like supplied from the microphone 15, the CCD camera 16, the touch sensor 17, and the like, and informs the model storage unit 51 and the action determining unit 52 of state recognition information indicating the recognition result.

More specifically, the sensor input processor 50 includes a speech recognizer 50A. The speech recognizer 50A performs speech recognition of the speech signal supplied from the microphone 15. The speech recognizer 50A reports the speech recognition result, which is a command, such as "walk", "down", "chase the ball", or the like, as the state recognition information to the model storage unit 51 and the action determining unit 52.

The sensor input processor 50 includes an image recognizer 50B. The image recognizer 50B performs image recognition processing using the image signal supplied from the CCD camera 16. When the image recognizer 50B resultantly detects, for example, "a red, round object" or "a plane perpendicular to the ground of a predetermined height or greater", the image recognizer 50B reports the image recognition result such that "there is a ball" or "there is a wall" as the state recognition information to the model storage unit 51 and the action determining unit 52.

Furthermore, the sensor input processor 50 includes a pressure processor 50C. The pressure processor 50C processes the pressure detection signal supplied from the touch sensor 17. When the pressure processor 50C resultantly detects pressure which exceeds a predetermined threshold and which is applied in a short period of time, the pressure processor 50C recognizes that the robot has been "hit (punished)". When the pressure processor 50C detects pressure which falls below a predetermined threshold and which is applied over a long period of time, the pressure processor 50C recognizes that the robot has been "patted (rewarded)". The pressure processor 50C reports the recognition result as the state recognition information to the model storage unit 51 and the action determining unit 52.

The model storage unit 51 stores and manages emotion models, instinct models, and growth models for expressing emotional, instinctual, and growth states, respectively.

The emotional models represent emotional states (degrees) such as, for example, "happiness", "sadness", "anger", and "enjoyment" using values within a predetermined range. The values are changed based on the state recognition information from the sensor input processor 50, the elapsed time, and the like. The instinct models represent desire states (degrees) such as "hunger", "sleep", "movement", and the like using values within a predetermined range. The values are changed based on the state recognition information from the sensor input processor 50, the elapsed time, and the like. The growth models represent growth states (degrees) such as "childhood", "adolescence", "mature age", "old age", and the like using values within a predetermined range. The values are changed based on the state recognition information from the sensor input processor 50, the elapsed time, and the like.

In this manner, the model storage unit 51 outputs the emotional, instinctual, and growth states represented by values of the emotion models, instinct models, and growth models, respectively, as state information to the action determining unit 52.

The state recognition information is supplied from the sensor input processor 50 to the model storage unit 51. Also, action information indicating the contents of present or past actions taken by the robot, for example, "walked for a long period of time", is supplied from the action determining unit 52 to the model storage unit 51. Even if the same state recognition information is supplied, the model storage unit 51 generates different state information in accordance with robot's actions indicated by the action information.

More specifically, for example, if the robot says hello to the user and the robot is patted on the head by the user, action information indicating that the robot says hello to the user and state recognition information indicating that the robot is patted on the head are supplied to the model storage unit 51. In this case, the value of the emotion model representing "happiness" increases in the model storage unit 51.

In contrast, if the robot is patted on the head while performing a particular task, action information indicating that the robot is currently performing the task and state recognition information indicating that the robot is patted on the head are supplied to the model storage unit 51. In this case, the value of the emotion model representing "happiness" does not change in the model storage unit 51.

The model storage unit 51 sets the value of the emotion model by referring to the state recognition information and the action information indicating the present or past actions taken by the robot. Thus, when the user pats the robot on the head to tease the robot while the robot is performing a particular task, an unnatural change in emotion such as an increase in the value of the emotion model representing "happiness" is prevented.

As in the emotion models, the model storage unit 51 increases or decreases the values of the instinct models and the growth models based on both the state recognition information and the action information. Also, the model storage unit 51 increases or decreases the values of the emotion models, instinct models, or growth models based on the values of the other models.

The action determining unit 52 determines subsequent actions based on the state recognition information supplied from the sensor input processor 50, the state information supplied from the model storage unit 51, the elapsed time, and the like, and sends the contents of the determined action as action command information to the posture shifting unit 53.

Specifically, the action determining unit 52 manages a finite state automaton in which actions which may be taken by the robot are associated with states as an action model for defining the actions of the robot. A state in the finite state automaton as the action model undergoes a transition based on the state recognition information from the sensor input processor 50, the values of the emotion models, the instinct models, or the growth models in the model storage unit 51, the elapsed time, and the like. The action determining unit 52 then determines an action that corresponds to the state after the transition as the subsequent action.

If the action determining unit 52 detects a predetermined trigger, the action determining unit 52 causes the state to undergo a transition. In other words, the action determining unit 52 causes the state to undergo a transition when the action that corresponds to the current state has been performed for a predetermined period of time, when predetermined state recognition information is received, or when the value of the emotional, instinctual, or growth state indicated by the state information supplied from the model storage unit 51 becomes less than or equal to a predetermined threshold or becomes greater than or equal to the predetermined threshold.

As described above, the action determining unit 52 causes the state in the action model to undergo a transition based not only on the state recognition information from the sensor input processor 50 but also on the values of the emotion models, the instinct models, and the growth models in the model storage unit 51, and the like. Even if the same state recognition information is input, the next state differs according to the values of the emotion models, the instinct models, and the growth models (state information).

As a result, for example, when the state information indicates that the robot is "not angry" and "not hungry", and when the state recognition information indicates that "a hand is extended in front of the robot", the action determining unit 52 generates action command information that instructs the robot to "shake a paw" in response to the fact that the user's hand is extended in front of the robot. The action determining unit 52 transmits the generated action command information to the posture shifting unit 53.

When the state information indicates that the robot is "not angry" and "hungry", and when the state recognition information indicates that "a hand is extended in front of the robot", the action-determining unit 52 generates action command information that instructs the robot to "lick the hand" in response to the fact that the user's hand is extended in front of the robot. The action determining unit 52 transmits the generated action command information to the posture shifting unit 53.

For example, when the state information indicates the robot is "angry", and when the state recognition information indicates that "a hand is extended in front of the robot", the action determining unit 52 generates action command information that instructs the robot to "turn the robot's head away" regardless of the state information indicating that the robot is "hungry" or "not hungry". The action determining unit 52 transmits the generated action command information to the posture shifting unit 53.

The action determining unit 52 can determine the walking speed, the magnitude and speed of the leg movement, and the like, which are parameters of the action that corresponds to the next state, based on the emotional, instinctual, and growth states indicated by the state information supplied from the model storage unit 51. In this case, the action command information including the parameters is transmitted to the posture shifting unit 53.

As described above, the action determining unit 52 generates not only the action command information that instructs the robot to move its head and legs but also action command information that instructs the robot to speak. The action command information that instructs the robot to speak is supplied to the speech synthesizer 55. The action command information supplied to the speech synthesizer 55 includes text that corresponds to a synthesized sound to be generated by the speech synthesizer 55. In response to the action command information from the action determining unit 52, the speech synthesizer 55 generates a synthesized sound based on the text included in the action command information. The synthesized sound is supplied to the loudspeaker 18 through the output controller 57 and is output from the loudspeaker 18. Thus, the loudspeaker 18 outputs the robot's voice, various requests such as "I'm hungry" to the user, responses such as "what?" in response to user's verbal contact, and other speeches.

The posture shifting unit 53 generates posture shifting information for causing the robot to move from the current posture to the next posture based on the action command information supplied from the action determining unit 52 and transmits the posture shifting information to the control unit 54.

The next state which the current state can change to is determined based on the shape of the body and legs, weight, physical shape of the robot such as the connection state between portions, and the mechanism of the actuators $3AA_1$ to $5A_1$ and $5A_2$ such as the bending direction and angle of the joint.

The next state includes a state to which the current state can directly change and a state to which the current state cannot directly change. For example, although the four-legged robot can directly change to a down state from a lying state in which the robot sprawls out its legs, the robot cannot directly change to a standing state. The robot is required to perform a two-step action. First, the robot lies down on the ground with its limbs pulled toward the body, and then the robot stands up. Also, there are some postures that the robot cannot reliably assume. For example, if the four-legged robot which is currently in a standing position tries to hold up its front paws, the robot easily falls down.

The posture shifting unit 53 stores in advance postures that the robot can directly change to. If the action command information supplied from the action determining unit 52 indicates a posture that the robot can directly change to, the posture shifting unit 53 transmits the action command information as posture shifting information to the control unit 54. In contrast, if the action command information indicates a posture that the robot cannot directly change to, the posture shifting unit 53 generates posture shifting information that causes the robot to first assume a posture that the robot can directly change to and then to assume the target posture and transmits the posture shifting information to the control unit 54. Accordingly, the robot is prevented from forcing itself to assume an impossible posture or from falling down.

The control unit 54 generates control signals for driving the actuators $3AA_1$ to $5A_1$ and $5A_2$ in accordance with the posture shifting information supplied from the posture shifting unit 53 and sends the control signals to the actuators $3AA_1$ to $5A_1$ and $5A_2$. Therefore, the actuators $3AA_1$ to $5A_1$ and $5A_2$ are driven in accordance with the control signals, and hence, the robot autonomously executes the action.

The echo back unit 56 monitors a speech signal which is supplied from the microphone 15 and which is subjected to speech recognition by the speech recognizer 50A and generates and outputs speech that echoes back the speech signal (hereinafter referred to as echo back speech). The echo back speech is supplied to the loudspeaker 18 through the output controller 57 and is output from the loudspeaker 18.

Digital data on the synthesized sound from the speech synthesizer 55 and digital data on the echo back speech from the echo back unit 56 are supplied to the output controller 57. The digital data are subjected to D/A conversion into an analog speech signal, and the analog speech signal is supplied to the loudspeaker 18 and is output from the loudspeaker 18. If the synthesized sound from the speech synthesizer 55 and the echo back speech from the echo back unit 56 are output to the loudspeaker 18 so as to compete with each other, the competition is adjusted. Specifically, the outputting of the echo back speech from the echo back unit 56 is configured to be performed independently of the outputting of the synthesized sound performed by the speech synthesizer 55 under the control of the action determining unit 52. Thus, the outputting of the echo back speech and the outputting of the synthesized sound may compete with each other. In this case, the output control unit 57 adjusts the competition.

Figure 4:
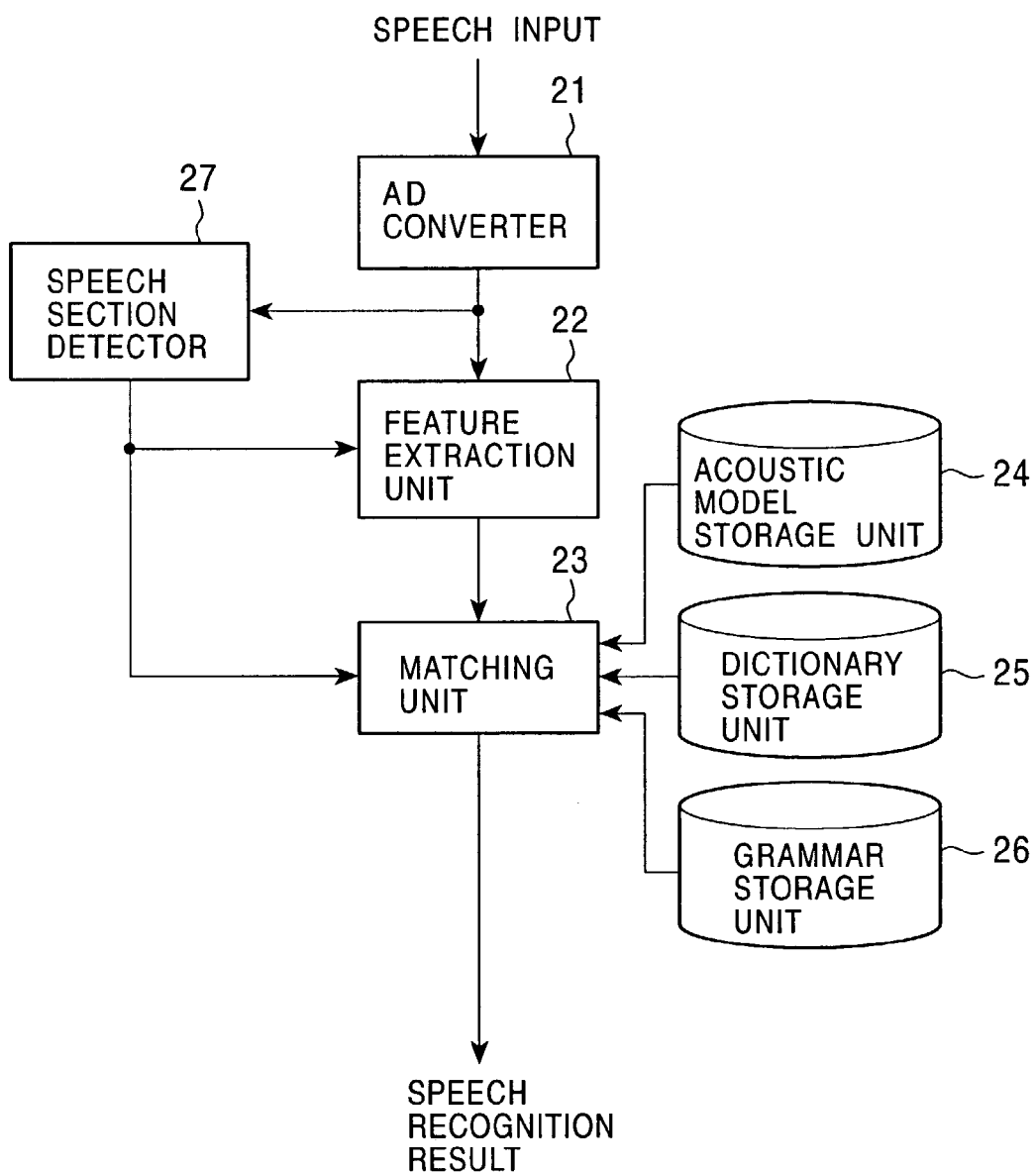
FIG. 4 is a block diagram showing an example of the structure of a speech recognizer 50A.

FIG. 4 shows an example of the structure of the speech recognizer 50A shown in FIG. 3.

The speech signal from the microphone 15 is supplied to an AD (Analog Digital) converter 21. The AD converter 21 samples the speech signal, which is an analog signal supplied from the microphone 15, and quantizes the sampled speech signal, thereby converting the signal into speech data, which is a digital signal. The speech data is supplied to a feature extraction unit 22 and a speech section detector 27.

The feature extraction unit 22 performs, for example, an MFCC (Mel Frequency Cepstrum Coefficient) analysis of the speech data, which is input thereto, in units of appropriate frames and outputs MFCCs which are obtained as a result of the analysis as feature parameters (feature vectors) to a matching unit 23. Also, the feature extraction unit 22 can extract feature parameters such as linear prediction coefficients, cepstrum coefficients, line spectrum pairs, and power in each predetermined frequency band (output of a filter bank).

Based on the feature parameters supplied from the feature extraction unit 22, the matching unit 23 performs speech recognition of the speech (input speech) input to the microphone 15 based on, for example, a continuously-distributed HMM (Hidden Markov Model) method by referring to the acoustic model storage unit 24, the dictionary storage unit 25, and the grammar storage unit 26 if necessary.

Specifically, the acoustic model storage unit 24 stores an acoustic model indicating acoustic features of each phoneme or each syllable in the language of speech which is subjected to speech recognition. Speech recognition is performed based on the continuously-distributed HMM method. The HMM (Hidden Markov Model) is used as the acoustic model. The dictionary storage unit 25 stores a word dictionary that contains information (phoneme information) concerning the pronunciation of each word to be recognized. The grammar storage unit 26 stores grammar rules describing how words registered in the word dictionary of the dictionary storage unit 25 are linked and concatenated. For example, context-free grammar (CFG) or a rule which is based on statistical word concatenation probability (N-gram) can be used as the grammar rule.

The matching unit 23 refers to the word dictionary of the dictionary storage unit 25 to connect the acoustic models stored in the acoustic model storage unit 24, thus forming the acoustic model (word model) for a word. The matching unit 23 also refers to the grammar rule stored in the grammar storage unit 26 to connect word models and uses the connected word models to recognize speech input via the microphone 15 based on the feature parameters by using the continuously-distributed HMM method. In other words, the matching unit 23 detects a sequence of word models with the highest score (likelihood) of the time-series feature parameters being observed, which are output by the feature extraction unit 22. The matching unit 23 outputs phoneme information (pronunciation) on a word string that corresponds to the sequence of word models as the speech recognition result.

More specifically, the matching unit 23 accumulates the probability of each feature parameter occurring with respect to the word string that corresponds to the connected word models and assumes the accumulated value as a score. The matching unit 23 outputs phoneme information on the word string that has the highest score as the speech recognition result.

The recognition result of the speech input to the microphone 15, which is output as described above, is output as state recognition information to the model storage unit 51 and to the action determining unit 52.

With respect to the speech data from the AD converter 21, the speech section detector 27 computes power in each frame as in the MFCC analysis performed by the feature extraction unit 22. Furthermore, the speech section detector 27 compares the power in each frame with a predetermined threshold and detects a section formed by a frame having power which is greater than or equal to the threshold as a speech section in which the user's speech is input. The speech section detector 27 supplies the detected speech section to the feature extraction unit 22 and the matching unit 23. The feature extraction unit 22 and the matching unit 23 perform processing of only the speech section.

Figure 5:
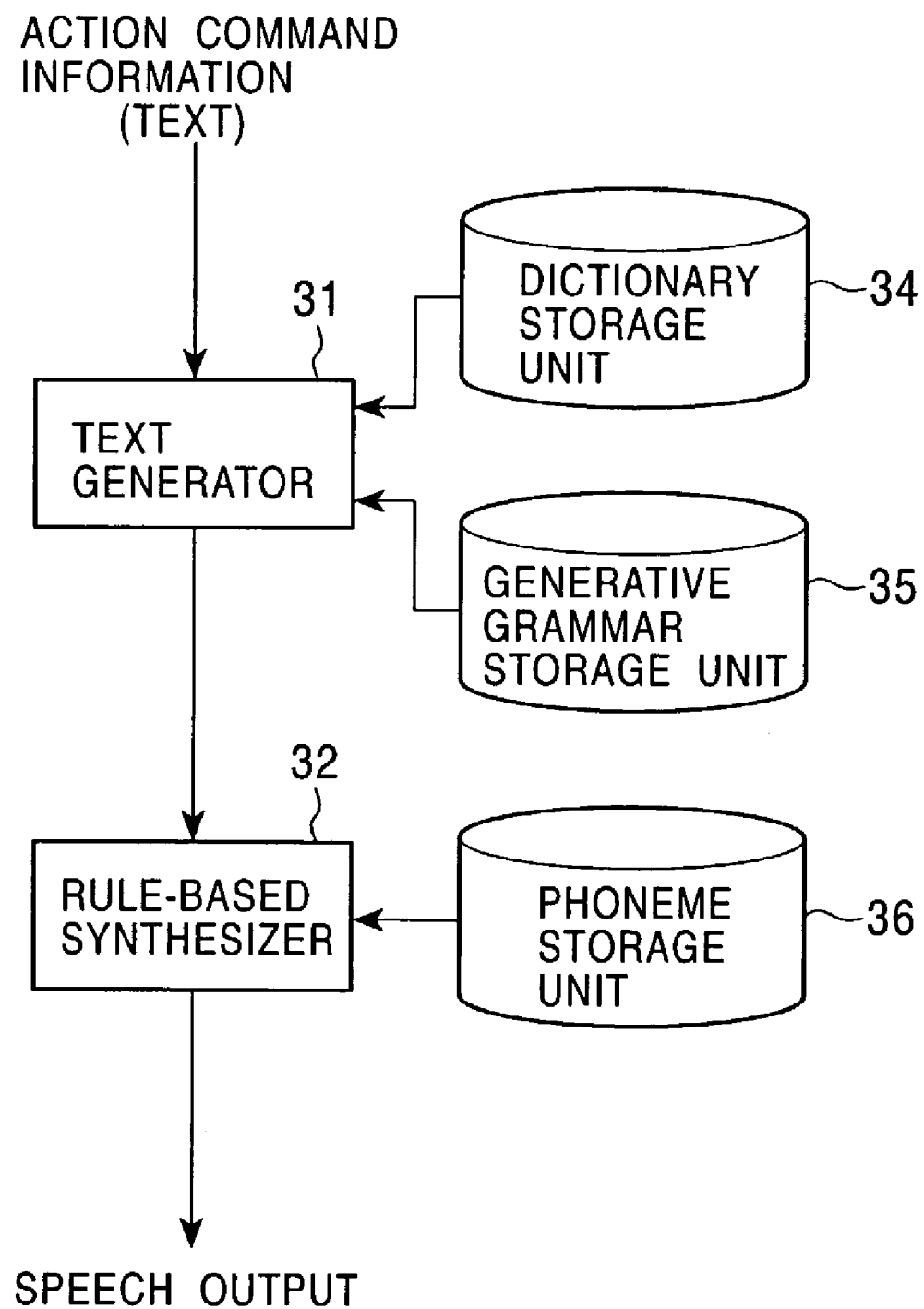
FIG. 5 is a block diagram showing an example of the structure of a speech synthesizer 55.

FIG. 5 shows an example of the structure of the speech synthesizer 55 shown in FIG. 3.

Action command information including text which is subjected to speech synthesis and which is output from the action determining unit 52 is supplied to a text generator 31. The text generator 31 refers to the dictionary storage unit 34 and a generative grammar storage unit 35 and analyzes the text included in the action command information.

Specifically, the dictionary storage unit 34 stores a word dictionary including parts-of-speech information, pronunciation information, and accent information on each word. The generative grammar storage unit 35 stores generative grammar rules such as restrictions on word concatenation about each word included in the word dictionary of the dictionary storage unit 34. Based on the word dictionary and the generative grammar rules, the text generator 31 performs morphological analysis and parsing syntactic analysis of the input text. The text generator 31 extracts information necessary for rule-based speech synthesis performed by a rule-based synthesizer 32 at the subsequent stage. The information required for rule-based speech synthesis includes, for example, information for controlling the position of a pause, accent, and intonation, other prosodic information, and phonemic information such as the pronunciation of each word.

The information obtained by the text generator 31 is supplied to the rule-based synthesizer 32. The rule-based synthesizer 32 refers to a phoneme storage unit 36 and generates speech data (digital data) on a synthesized sound which corresponds to the text input to the text generator 31.

Specifically, the phoneme storage unit 36 stores phoneme data in the form of CV (consonant, vowel), VCV, CVC, and the like. Based on the information from the text generator 31, the rule-based synthesizer 32 connects necessary phoneme data and appropriately adds pause, accent, and intonation by manipulating the waveform of the phoneme data, thereby generating the speech data for the synthesized sound corresponding to the text input to the text generator 31.

The speech data generated as described above is supplied to the loudspeaker 18 through the output controller 57 (FIG. 3). Accordingly, the loudspeaker 18 outputs the synthesized sound that corresponds to the text input to the text generator 31.

As described above, the action determining unit 52 shown in FIG. 3 determines subsequent actions based on the action models. The contents of the text which is output as the synthesized sound can be associated with the actions taken by the robot.

Specifically, for example, when the robot executes an action of changing from a sitting state to a standing state, the text "alley-oop!" can be associated with the action. In this case, when the robot changes from the sitting state to the standing state, the synthesized sound "alley-oop!" can be output in synchronization with the change in the posture.

Figure 6:
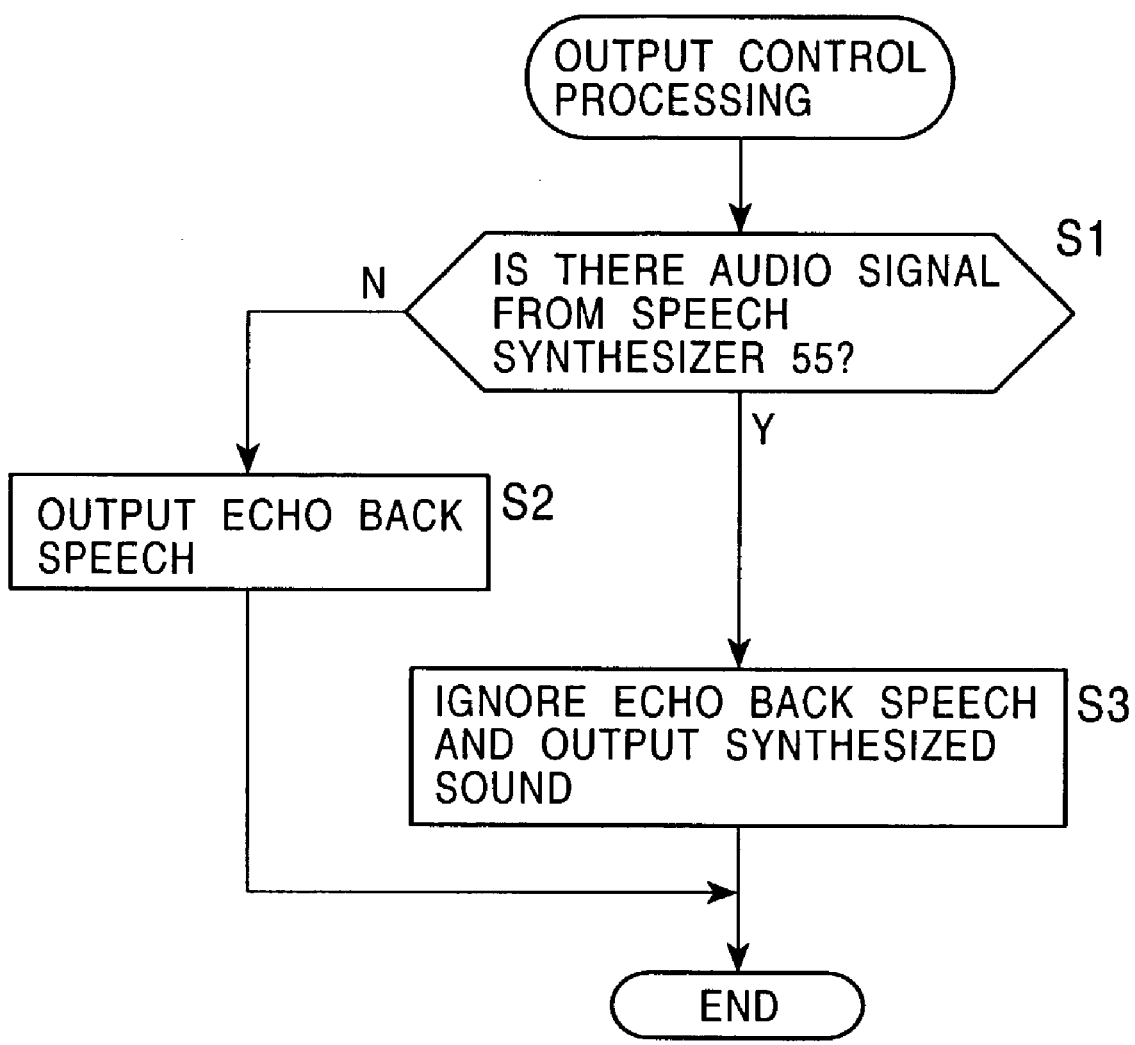
FIG. 6 is a flowchart illustrating processing performed by an output controller 57.

Referring to a flowchart shown in FIG. 6, the processing (output control processing) performed by the output controller 57 shown in FIG. 3 is described.

In response to a synthesized sound from the speech synthesizer 55, the output controller 57 supplies the synthesized sound from the speech synthesizer 55 to the loudspeaker 18 as long as no echo back speech from the echo back unit 56 is received by the output controller 57, thereby outputting the synthesized sound from the loudspeaker 18.

In response to echo back speech from the echo back unit 56, the output controller 57 performs the output control processing in accordance with the flowchart shown in FIG. 6.

Specifically, in response to the echo back speech from the echo back unit 56, the output controller 57 first determines in step S1 whether or not a synthesized sound is output from the speech synthesizer 55. If it is determined that no synthesized sound is output, the output controller 57 proceeds to step S2 and supplies the echo back speech received from the echo back unit 56 to the loudspeaker 18, thereby outputting the synthesized sound from the loudspeaker 18. Subsequently, the processing is terminated.

In contrast, in step S1, if it is determined that a synthesized sound is output from the speech synthesizer 55, that is, if the outputting of the synthesized sound from the speech synthesizer 55 competes with the outputting of the echo back speech from the echo back unit 56, the output controller 57 proceeds to step S3 and restricts the outputting of the echo back speech. The output controller 57 supplies the synthesized sound from the speech synthesizer 55 to the loudspeaker 18, thereby outputting the synthesized sound from the loudspeaker 18. Subsequently, the processing is terminated.

If the output controller 57 receives a synthesized sound from the speech synthesizer 55 while outputting the echo back speech, the outputting of the echo back speech is stopped. The output controller 57 gives priority to the outputting of the synthesized sound from the speech synthesizer 55.

As described above, when the outputting of the synthesized sound from the speech synthesizer 55 competes with the outputting of the echo back speech from the echo back unit 56, the output controller 57 gives priority to the outputting of the synthesized sound from the speech synthesizer 55. This is because the outputting of the synthesized sound from the speech synthesizer 55 is based on the action command information from the action determining unit 52 and therefore is an action to be taken by the robot. In contrast, the outputting of the echo back speech merely repeats the user's speech. For the user, the synthesized sound from the speech synthesizer 55 has a higher priority than the echo back speech.

Alternatively, the output controller 57 can give priority to the outputting of the echo back speech over the outputting of the synthesized sound from the speech synthesizer 55. Alternatively, the output controller 57 can give priority to either the echo back speech or the synthesized speech from the speech synthesizer 55, depending on which is received first.

Figure 7:
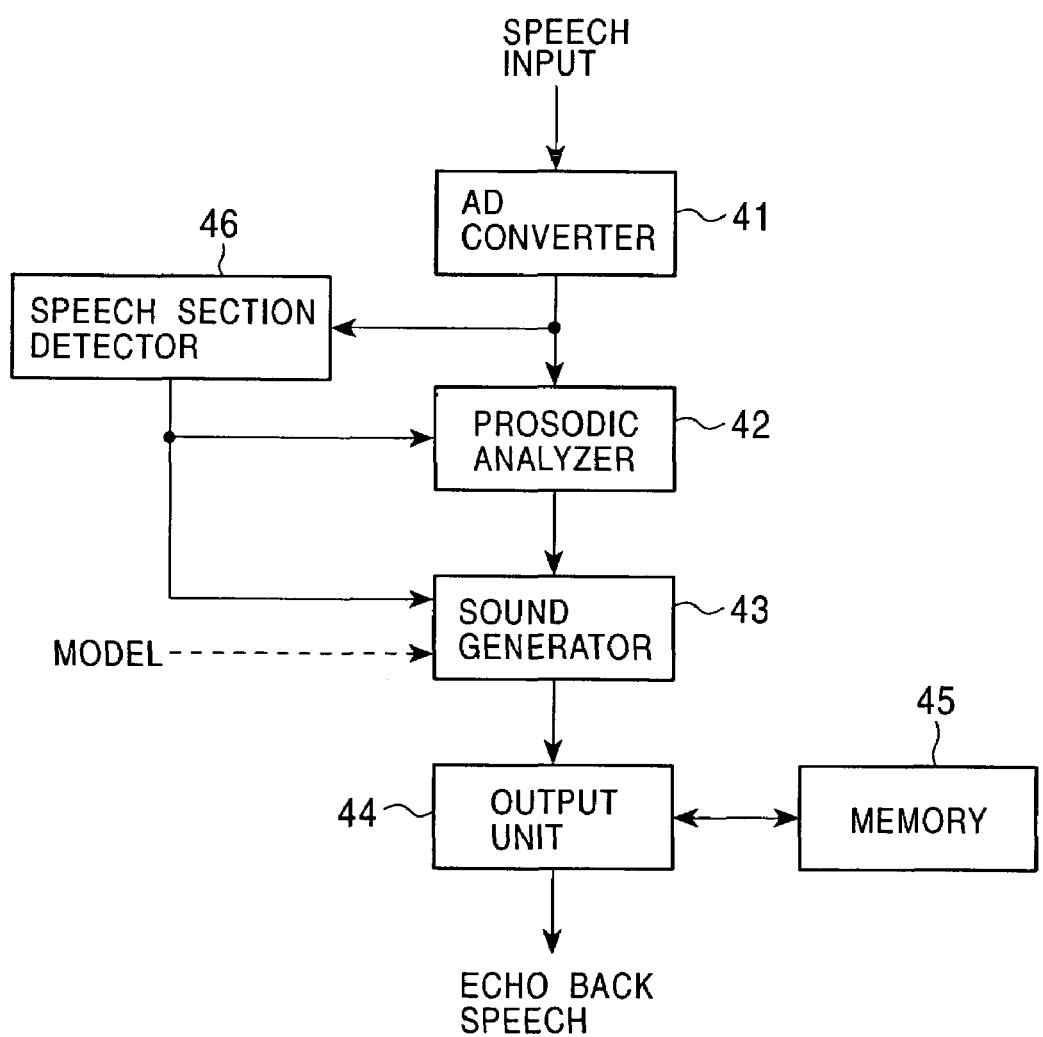
FIG. 7 is a block diagram showing an example of the structure of an echo back unit 56.

FIG. 7 shows an example of the structure of the echo back unit 56 shown in FIG. 3.

A speech signal from the microphone 15 is supplied to an AD converter 41. The AD converter 41 samples the speech signal, which is an analog signal supplied from the microphone 15, and quantizes the sampled speech signal, thereby A/D converting the signal into speech data, which is a digital signal. The speech data is supplied to a prosodic analyzer 42 and a speech section detector 46.

The prosodic analyzer 42 performs an acoustic analysis of the speech data, which is input thereto, in units of appropriate frames and extracts prosodic information such as a pitch frequency and power of the speech data. The prosodic information is supplied to a sound generator 43.

Specifically, the prosodic analyzer 42 assumes that one frame is a period longer than a normal human pitch period, such as 32 ms, and obtains a pitch frequency and power of speech data from the AD converter 41 in units of frames.

More specifically, the prosodic analyzer 42 computes the power P(j) of the i-th frame in accordance with the following equation:

$$P(j) = \Sigma x_i^2 \tag{1}$$

In equation (1), $x_i$ represents a sampled value of the i-th speech data from the beginning of the j-th frame, and $\Sigma$ represents a summation of all the samples of the speech data in the j-th frame.

The prosodic analyzer 42 computes an auto-correlation value of a sample of the speech data in the j-th frame, computes the amount (time) $\tau$ which maximizes the auto-correlation value and which is not zero, and computes a pitch frequency f(j) in the j-th frame using the following equation:

$$f(j) = 1/\tau \tag{2}$$

The sound generator 43 generates prosody-controlled echo back speech based on the prosodic information from the prosodic analyzer 42.

Specifically, the sound generator 43 generates speech which has the same prosody as the prosodic information from the prosodic analyzer 42 and which is without any phonemes (hereinafter referred to as no-phoneme speech if necessary) by superposing a sine wave and supplies the generated speech as echo back speech to an output unit 44.

Concerning a method for generating speech data based on the prosodic information including, for example, the pitch frequency and power, examples are described in "Imitation by echoing speech using non-segmental sounds and their psychological effects" by Suzuki, Ishii, and Takeuchi, Transactions of Information Processing Society of Japan, vol. 41, No. 5, pp. 1328–1337, May 2000; Japanese Unexamined Patent Application Publication No. 2000-181896; and the like.

The output unit 44 stores the echo back speech data from the sound generator 43 in a memory 45 and outputs the data to the output controller 57 (FIG. 3).

The speech section detector 46 similarly performs processing of the speech data from the AD converter 41 as in the speech section detector 27 shown in FIG. 4, thereby detecting a speech section. The speech section detector 46 supplies the speech section to the prosodic analyzer 42 and the sound generator 43. Accordingly, the prosodic analyzer 42 and the sound generator 43 only performs processing of the speech section.

The AD converter 41 or the speech section detector 46 shown in FIG. 7 can be combined with the AD converter 21 or the speech section detector 27 shown in FIG. 4, respectively.

Figure 8:
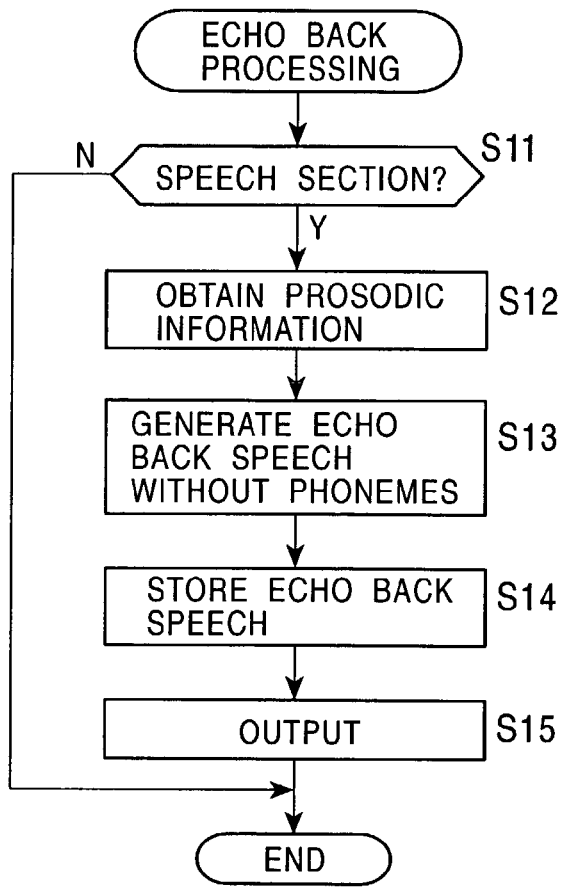
FIG. 8 is a flowchart illustrating echo back processing performed by the echo back unit 56.

The echo back unit 56 arranged as described above performs, for example, echo back processing in accordance with a flowchart shown in FIG. 8.

Specifically, in step S11, the speech section detector 46 determines whether or not the output data from the AD converter 41 includes a speech section. If it is determined that the data includes no speech section, the processing is terminated, and the echo back processing resumes in step S11.

If it is determined in step S11 that the data includes a speech section, that is, if the user's speech is input to the microphone 15, in step S12, the prosodic analyzer 42 performs an acoustic analysis of the output data from the AD converter 41, that is, the user's speech input to the microphone 15, and obtains prosodic information. The prosodic information is supplied to the sound generator 43.

In step S13, the sound generator 43 generates no-phoneme speech which has the same prosody as the prosody information from the prosodic analyzer 42 and supplies the generated no-phoneme speech as echo back speech to the output unit 44.

In step S14, the output unit 44 stores the echo back speech data from the sound generator 43 in the memory 45. In step S15, the output unit 44 outputs the echo back speech to the output controller 57 (FIG. 3), and the processing is terminated.

Thus, the echo back speech is supplied to the loudspeaker 18 through the output controller 57, thereby outputting the echo back speech from the loudspeaker 18.

In this case, the prosody is removed from the user's speech, and the generated sound is output as the echo back speech from the loudspeaker 18.

The echo back speech repeats the user's speech which is subjected to speech recognition performed by the speech recognizer 50A. As a result of outputting the echo back speech, the user can hear the echo back speech and recognizes that the user's speech has been accepted by the robot. If the robot makes no action in response to the user's speech (including both a case in which the user's speech is correctly recognized and a case in which the user's speech is erroneously recognized by the speech recognizer 50A), the user is prevented from misunderstanding that the robot is broken.

Since the echo back speech is not exactly the user's speech but the speech from which its phoneme has been removed, it sounds to the user as if the robot understands the user and repeats what the user says in its own voice. Since the echo back speech has the same prosody as the user's speech, the echo back speech expresses emotions indicated by the prosody. As a result, it sounds to the user as if the robot understands the user's emotions. Thus, it is possible to give the user the impression that the user's speech is not simply recorded and played back but actually the robot understands the user's speech.

The echo back speech is generated by the sound generator 43 by superimposing a sine wave. Alternatively, for example, the echo back speech can be generated by preparing complex waveforms which represent the robot's voice and by connecting the waveforms. Alternatively, the echo back speech can be generated by recognizing phonemes forming the user's speech and generating speech which has a phonetic unit containing a sequence of phonemes. Alternatively, the echo back speech can be generated by obtaining cepstrum coefficients for the user's speech and by generating speech by a digital filter which uses the cepstrum coefficients as tap coefficients.

If the echo back speech is too similar to the user's speech, the user may be given an uninteresting impression that the user's speech is simply recorded and played back by the robot. It is thus desirable that the echo back speech should not closely resemble the user's speech.

In the above case, the sound generator 43 generates the echo back speech which has the same prosody as that of the user's speech. Alternatively, the sound generator 43 can generate echo back speech with prosody which is obtained by slightly manipulating the prosody of the user's speech.

Specifically, for example, as described above, when the prosodic analyzer 42 obtains the power P(j) and the pitch frequency f(j) in the j-th frame, the sound generator 43 uses the power P(j) and the pitch frequency f(j) to generate echo back speech y(t) in accordance with, for example, the following equation:

$$y(t) = \log(P(j))\sin(2\pi N f(j) t) \tag{3}$$

wherein N is a positive integer in equation (3).

In accordance with equation (3), the echo back speech y(t) is generated by non-linearizing the power P(j) of the j-th frame speech by logarithm and multiplying the pitch frequency f(j) by N.

Empirically, when N is set to, for example, six, echo back speech which sounds like the robot's voice and which is listenable can be produced.

In the foregoing case, the echo back speech of the same duration as that of the speech section of the user's speech is output. Alternatively, the duration of echo back speech can be made different from that of the speech section of the user's speech.

Specifically, when echo back speech is generated in accordance with equation (3), the power P(j) and the pitch frequency f(j) can be interpolated or decimated, thereby generating echo back speech having a duration longer than or shorter than that of the speech section of the user's speech.

Empirically, when the duration of echo back speech is increased by multiplying the duration of the speech section of the user's speech by 3/2 or the like, the echo back speech sounds natural to the user.

In the echo back unit 56 shown in FIG. 7, the echo back speech is stored in the memory 45. The output unit 44 performs re-echo back processing by reading and outputting the echo back speech stored in the memory 45 if necessary.

Figure 9:
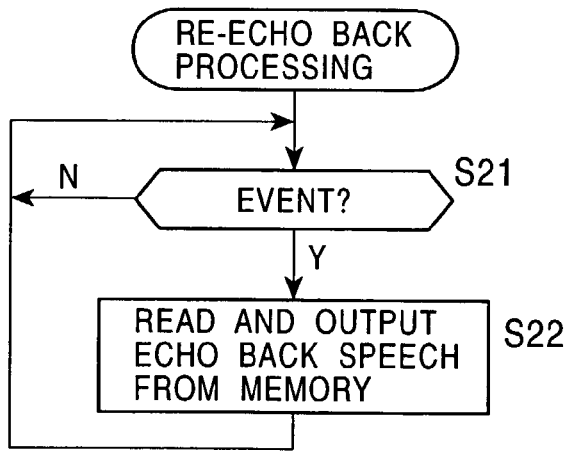
FIG. 9 is a flowchart illustrating re-echo back processing performed by the echo back unit 56.

Specifically, the re-echo back processing is shown in a flowchart of FIG. 9. In step S21, the output unit 44 determines whether or not a predetermined event has occurred. If the output unit 44 determines that no predetermined event has occurred, the output unit 44 returns to step S21.

If it is determined in step S21 that the predetermined event has occurred, in step S22, the output unit 44 reads the predetermined echo back speech data stored in the memory 45 and supplies the data to the loudspeaker 18 through the output controller 57. The output unit 44 returns to step S21.

In the re-echo back processing, if a predetermined event has occurred, the predetermined echo back speech stored in the memory 45 is output from the loudspeaker 18.

The following cases can be regarded as the predetermined event. For example, a particular value is preset, and a random number is generated. If the random number coincides with the preset number, it is determined that a predetermined event has occurred. Alternatively, if a state in which no external data is input lasts for a predetermined period of time, it is determined that a predetermined event has occurred. In such cases, it seems to the user that the robot has suddenly started talking although no stimulus is given to the robot. As a result, the robot becomes more entertaining.

The echo back speech data is stored in the memory 45 in association with predetermined action command information output by the action determining unit 52. When the action determining unit 52 outputs action command information, echo back speech that is associated with the output action command information can be read from the memory 45. In this case, the echo back speech associated with the action command information is output in synchronization with an action that corresponds to the action command information output by the action determining unit 52.

Figure 10:
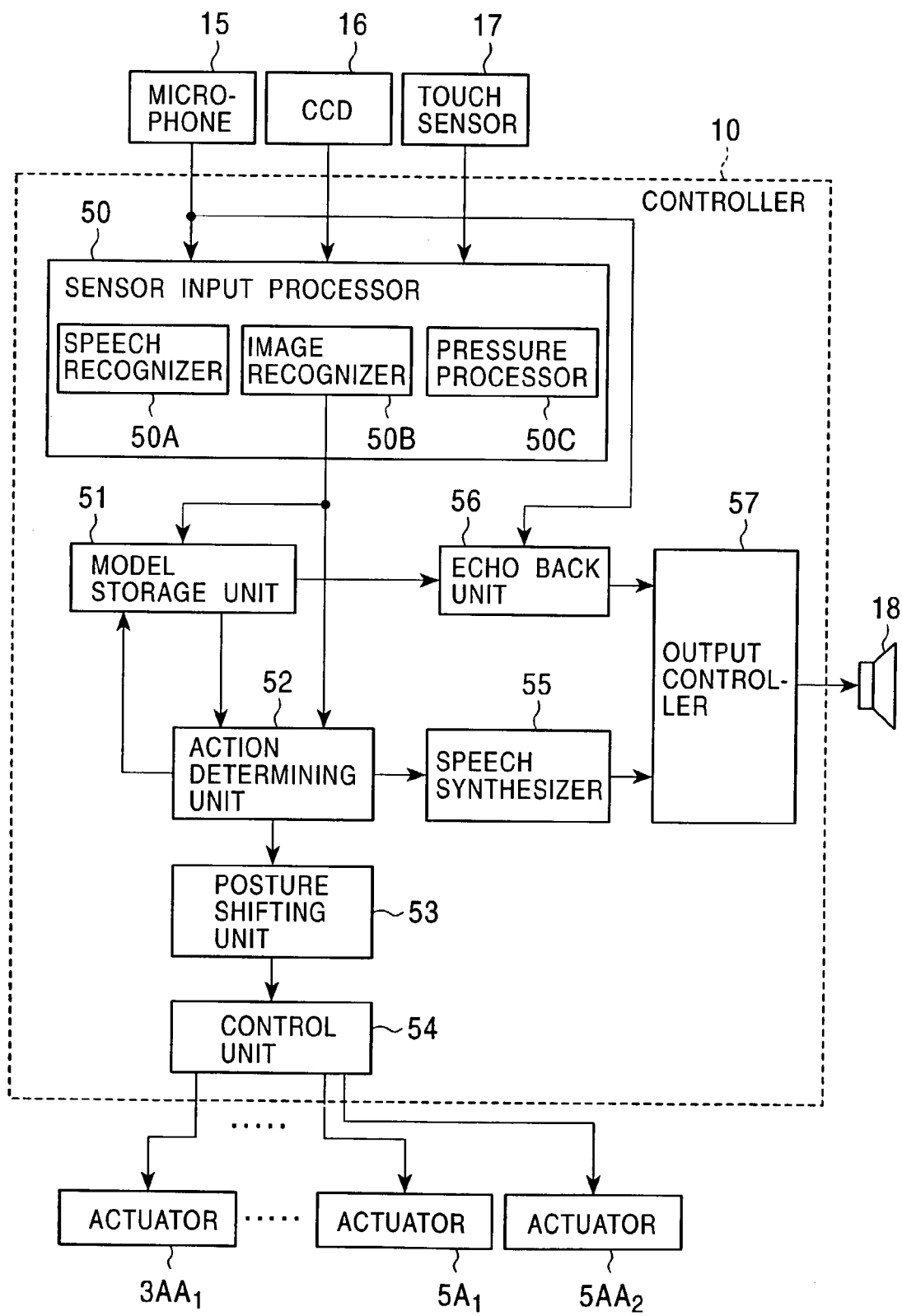
FIG. 10 is a block diagram showing another example of the function structure of the controller 10.

FIG. 10 shows another example of the structure of the controller 10. In the drawing, the same reference numerals are given to parts similar to those in FIG. 3, and detailed descriptions of the common portions are omitted. In other words, the controller 10 shown in FIG. 10 has the same structure as that in FIG. 3 except for the fact that the echo back unit 56 can refer to models stored in the model storage unit 51.

If the controller 10 is arranged as shown in FIG. 10, as indicated by a dotted line in FIG. 7, the sound generator 43 in the echo back unit 56 refers to emotion models, instinct models, and growth models stored in the model storage unit 51.

The sound generator 43 generates prosody-controlled echo back speech which is obtained by controlling the prosody extracted from the user's speech based on emotions, instincts, and growth states expressed by the emotion models, instinct models, and growth models.

Specifically, for example, when the degree of happiness or sadness of the robot is great, the sound generator 43 generates echo back speech at a high pitch frequency or a low pitch frequency in accordance with the degree. If the degree of anger of the robot is great, the sound generator 43 generates echo back speech whose utterance duration is short in accordance with the degree. If the degree of growth of the robot is great, the sound generator 43 increases the pitch frequency at the ending of the echo back speech as if the robot is asking a question. In this case, the user is prompted to say something.

In the re-echo back processing shown in FIG. 9, the predetermined echo back speech stored in the memory 45 is played in response to a predetermined event such as a random number or an external input. As in the example shown in FIG. 10, when the sound generator 43 of the echo back unit 56 refers to the emotional models, instinctual models, and growth models stored in the model storage unit 51, the echo back speech generated by the sound generator 43 is stored in the memory 45 in association with the value of an emotional model at the time that echo back speech is generated. A predetermined event occurs when the value of an emotional model stored in the model storage unit 51 coincides with the value of the emotional model stored in the memory 45. The echo back speech associated with the value of the coincided emotional model is played and output from the memory 45.

In this case, according to the re-echo back processing, the echo back speech stored in the memory 45 is played when the value of an emotional model coincides with the value of the emotional model at the time that echo back speech was played in the past. If the robot enters a particular state in which the robot has a particular emotion, the robot outputs the same echo back speech. As a result, the user hears the echo back speech and understands the state or the emotion of the robot. The user and the robot can share emotions and the like.

The action-determining unit 52 and the output controller 57 can be configured to perform communication with each other. In this case, the action determining unit 52 can generate action command information for activating the actuator that moves the lower jaw 4A (FIG. 1) when the speech data is output from the output controller 57 to the loudspeaker 18. In this case, the lower jaw 4A moves in synchronization with the speech output from the loudspeaker 18. It is thus possible to give the impression to the user that the robot is actually talking.

Furthermore, the action determining unit 52 can control the movement of the lower jaw 4A based on prosodic information such as power or the like regarding the speech data output from the output controller 57 to the loudspeaker 18. Specifically, for example, if the power of the speech data is large, the lower jaw 4A is greatly moved, thereby increasing the opening of the robot's mouth. In contrast, if the power of the speech data is small, the lower jaw 4A is slightly moved, thereby reducing the opening of the robot's mouth. In this case, the opening of the robot's mouth changes in accordance with the loudness of the sound output from the loudspeaker 18. As a result, the robot's manner of speaking becomes more realistic.

Although there have been described herein cases in which the present invention is applied to the entertainment robot (robot as a pseudo pet), the present invention is not limited to these cases. For example, the present invention is widely applicable to various robots including industrial robots. The present invention is applicable not only to real-world robots but also to virtual robots displayed on a display such as a liquid crystal display.

Although it has been described in the present embodiment that a series of the above-described processes is performed by the CPU 10A by executing a program, the series of processes can be performed by dedicated hardware.

The program can be stored in advance in the memory 10B (FIG. 2). Alternatively, the program can be temporarily or permanently stored (recorded) in a removable recording medium such as a floppy disk, a CD-ROM (Compact Disc Read Only Memory), an MO (Magneto optical) disk, a DVD (Digital Versatile Disc), a magnetic disk, or a semiconductor memory. The removable recording medium can be provided as so-called packaged software, and the software can be installed in the robot (memory 10B).

Alternatively, the program can be transmitted wirelessly from a download site via a digital broadcasting satellite, or the program can be transmitted using wires through a network such as a LAN (Local Area Network) or the Internet. The transmitted program can be installed in the memory 10B.

In this case, when the version of the program is upgraded, the upgraded program can be easily installed in the memory 10B.

In the description, processing steps for writing the program that causes the CPU 10A to perform various processes are not required to be processed in time series in accordance with the order described in the flowcharts. Steps which are performed in parallel with each other or which are performed individually (for example, parallel processing or processing by an object) are also included.

The program can be processed by a single CPU. Alternatively, the program can be processed by a plurality of CPUs in a decentralized environment.

INDUSTRIAL APPLICABILITY

According to the present invention, prosodic information of a user's speech, which is subjected to speech recognition, is analyzed. Based on the prosodic information, prosody-controlled speech data which is speech data in which prosody is controlled is generated and output. Since the user can hear the prosody-controlled speech data, the user can recognize that the user's speech has been accepted by a robot.

The invention claimed is:

1. A robot control apparatus for controlling a robot which acts at least based on a speech recognition result, comprising:
    analyzing means for analyzing prosodic information of a user's speech which is subjected to speech recognition, the prosodic information indicating emotions of the user's speech;
    generating means for generating, based on the prosodic information, prosody-controlled speech data which is speech data in which prosody is controlled; and
    output control means to control echo back of the prosodic-controlled speech data to the user,
    wherein the echo back of the prosodic-controlled speech data is the user's speech from which phonemes have been removed and replaced with a voice of the robot containing substantially the same emotions as indicated by the prosodic information.

2. A robot control apparatus according to claim 1, wherein the generating means generates the prosodic-controlled speech data without any phonemes.

3. A robot control apparatus according to claim 1, further comprising:
    model storage means for storing models representing emotional, instinctual, or growth states of the robot,
    wherein the generating means generates the prosody-controlled speech data further based on the emotional, instinctual, or growth states of the robot, the states being represented by the models stored in the model storage means.

4. A robot control apparatus according to claim 1, further comprising:
    data storage means for storing the prosody-controlled speech data,
    wherein the output control means outputs the prosody-controlled speech data stored in the data storage means when a predetermined event occurs.

5. A robot control apparatus according to claim 1, further comprising:
    action control means for controlling the actions of the robot,
    wherein the output control means limits the outputting of the prosody-controlled speech data when speech is output under the control of the action control means.

6. A robot control apparatus according to claim 1, further comprising:
    action control means for causing the robot to move its mouth in synchronization with the outputting of the prosody-controlled speech data.

7. A robot control apparatus according to claim 6, wherein the action control means controls the movement of the robot's mouth based on the prosody-controlled speech data.

8. A robot control method for controlling a robot which acts at least based on a speech recognition result, comprising:
    an analyzing step of analyzing prosodic information of a user's speech which is subjected to speech recognition, the prosodic information indicating emotions of the user's speech;
    a generating step of generating, based on the prosodic information, prosody-controlled speech data which is speech data in which prosody is controlled; and
    an output control step of controlling echo back of the prosody-controlled speech data to the user,
    wherein the echo back of the prosodic-controlled speech data is the user's speech from which phonemes have been removed and replaced with a voice of the robot containing substantially the same emotions as indicated by the prosodic information.

9. A recording medium having recorded therein a program for causing a computer to perform a robot control process for controlling a robot which acts at least based on a speech recognition result, the program comprising:
    an analyzing step of analyzing prosodic information of a user's speech which is subjected to speech recognition, the prosodic information indicating emotions of the user's speech;
    a generating step of generating, based on the prosodic information, prosody-controlled speech data which is speech data in which prosody is controlled; and
    an output control step of controlling echo back of the prosody-controlled speech data to the user, wherein the echo back of the prosodic-controlled speech data is the user's speech from which phonemes have been removed and replaced with a voice of the robot containing substantially the same emotions as indicated by the prosodic information.

10. A program for causing a computer to perform a robot control process for controlling a robot which acts at least based on a speech recognition result, comprising:

analyzing step of analyzing prosodic information of a user's speech which is subjected to speech recognition, the prosodic information indicating emotions of the user's speech;

a generating step of generating, based on the prosodic information, prosody-controlled speech data which is speech data in which prosody is controlled; and an output control step of controlling echo back of the prosody-controlled speech data to the user wherein the echo back of the prosodic-controlled speech data is the user's speech from which phonemes have been removed and replaced with a voice of the robot containing substantially the same emotions as indicated by the prosodic information.

* * * * *